United States Patent

Nordstrom et al.

[11] 3,935,914
[45] Feb. 3, 1976

[54] VEHICLE PLATFORM SCALE

[75] Inventors: Kjell Helge Nordstrom; Nils Göran Ahl, both of Vasteras, Sweden

[73] Assignee: Aktiebolaget Smaefa, Stockholm, Sweden

[22] Filed: Nov. 13, 1974

[21] Appl. No.: 523,352

[30] Foreign Application Priority Data
Nov. 21, 1973 Sweden.............................. 7315757

[52] U.S. Cl.................................. 177/134; 177/211
[51] Int. Cl.$^2$.................... G01G 19/02; G01G 3/14
[58] Field of Search ............ 177/134, 135, 211, 255

[56] References Cited
UNITED STATES PATENTS
2,439,146  4/1948  Ruge.............................. 177/211 X
2,499,033  2/1950  Oberholtzer..................... 177/211 X
3,741,328  6/1973  Andersson et al................. 177/210

*Primary Examiner*—George H. Miller, Jr.

[57] ABSTRACT

A vehicle scale is disclosed having a weighbridge supported on a bed. It is characterized in that three load cells for sensing both upward and downward forces relative to the weighbridge at their opposite ends are secured between the weighbridge and the bed in such a manner that straight lines drawn from each load cell to each of the two remaining define a triangular surface whereby the weighbridge is able, together with the load cells, to respond not only to weight but also to the overturning moments which arise when the weight resultant of a vehicle standing on the weighbridge in order to be weighed lies outside the triangular surface.

4 Claims, 3 Drawing Figures

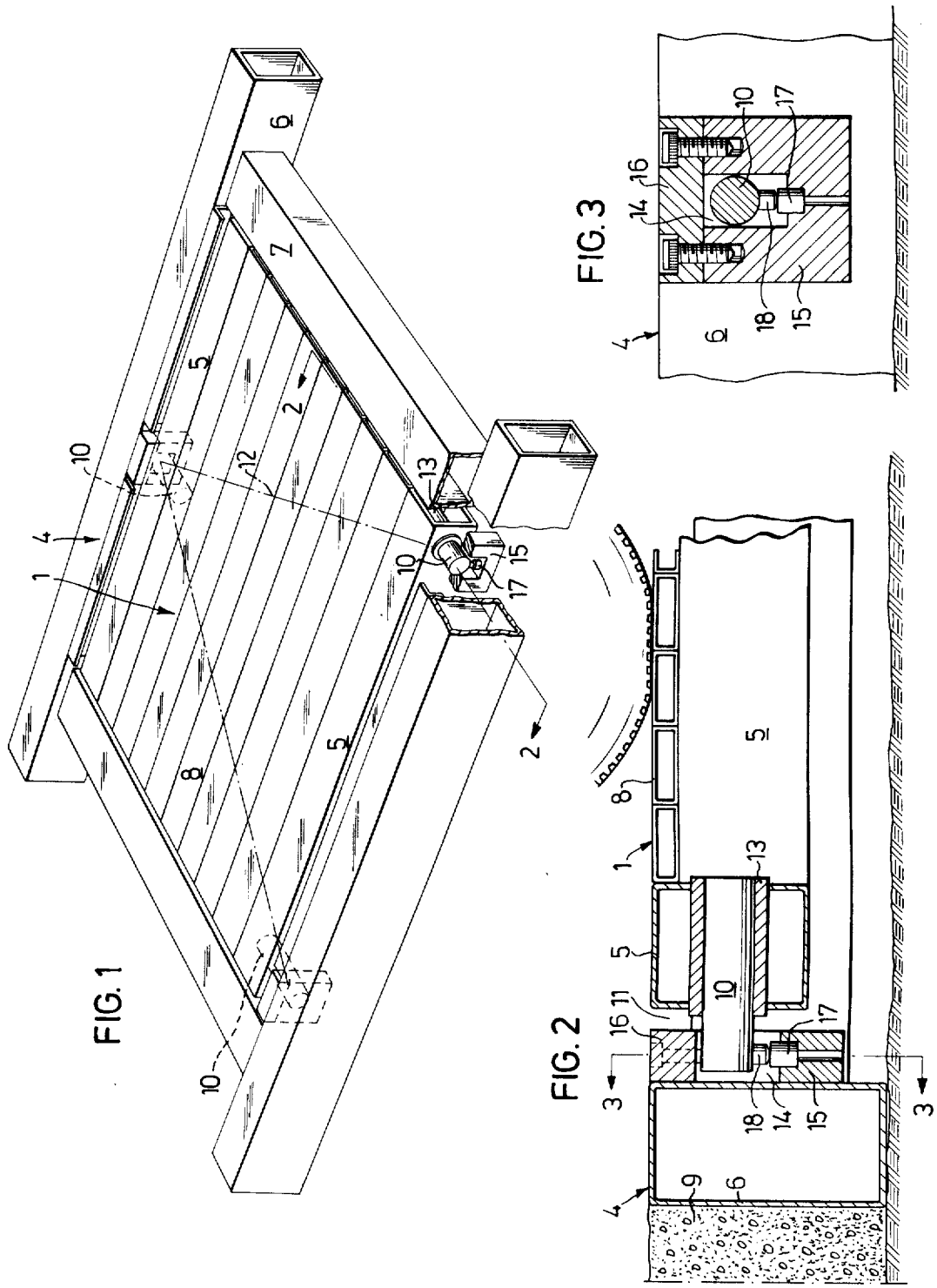

VEHICLE PLATFORM SCALE

The present invention concerns a vehicle scale of a type which has a load carrying weighbridge supported on a bed and upon which the vehicle to be weighed can be wholly or partly driven.

In order to ensure the necessary weighting accuracy the known scales of this type are provided with a rigid bed which, on account of the very great weights and dimensions of the vehicles, is often so bulky that it usually takes the form of a concrete construction hidden in a pit in the ground. A number of sensing means for compressive forces, e.g. in the form of compressive force sensing load cells, are then arranged between the bed and the weighbridge, with the help of which the weights of the vehicles can be determined.

There are many disadvantages with the known vehicle scales of this kind, and the demand for rigidity, resulting in the volume and weight of the bed being large and expensive, has proved to be especially troublesome. Furthermore, the known constructions also require an unnecessarily great number of load sensing means which results in even more increases in the cost of the construction. The different disadvantages combined have therefore resulted in the fact that, in general, vehicle scales of the type in question have been erected as stationary constructions. This development has been very unfavourable since the outcome has been that the desired weighings have not been able to take place where it has been most suitable but it has been necessary to visit weighing stations lying in remote areas in order that weighing can take place.

The main object of the present invention is to dispose of the necessity of large and expensive beds for weighing bridges and to provide instead a vehicle scale of the type mentioned in the above introduction which does not call for a stationary installation but is transportable and able to be erected on practically any kind of ground surface which is moderately level and which has sufficient carrying capacity for the purpose. Despite the fact that the bed does not need to be rigid from the distortion point of view or extensive in dimension, the scale, according to the invention, shall also be able to offer weighing results which are sufficiently accurate for the purpose.

For this purpose a vehicle scale according to the invention and having a load carrying weighbridge supported on a bed is chiefly characterized in that three load cells for sensing both upward and downward forces relative to the weighbridge at their opposite ends are secured between the weighbridge and the bed in such a manner that straight lines drawn from each one to the other two define a triangular surface whereby the weighbridge is able, together with the load cells, to respond not only to weight but also to the overturning moments which arise when the weight resultant of a vehicle standing on the weighbridge in order to be weighed lies outside the triangular surface. As a result the loading conditions of the scale are statically determined despite however much the load carrying bed of the weighbridge distorts itself on poor ground.

In order not to be sensitive to interference and easily read with simple and reliable instruments, the load cells, in a specially advantageous embodiment of the scale according to the invention, are transverse force sensing and are of the load beam type. They are also preferably secured with their geometrical axes parallel to the plane of the weighbridge. The bed itself can preferably consist of a frame surrounding the weighbridge.

The following is a closer description of the invention with reference to the drawings enclosed showing an embodiment thereof.

FIG. 1 is a schematic view in perspective of a suitable embodiment of a vehicle scale according to the invention which, in order to be more easily understood, is shown partly broken away in the region of a load cell secured therein, while FIGS. 2 and 3 are sections along line 2—2 in FIG. 1 and line 3—3 in FIG. 2, respectively, of this scale.

As can be seen from the drawings, the shown embodiment of a vehicle scale according to the invention consists of a weighbridge 1 which is supported by a bed 4. The weighbridge as well as the bed both mainly consist of a frame which is welded together of box girders 5 and 6,7, respectively, with rectangular cross sections. The bed surrounds the weighbridge and the top surface of the bed lies on a level with a platform consisting for example of box girders 8 which are placed in the frame of the weighbridge and form the surface of the bridge carrying the load or vehicle.

The bed 4, according to the invention, does not need to have any high degree of torsional resistance and when the scale is in use, it can therefore together with its weighbridge 1 be placed on any suitable ground surface which has sufficient carrying capacity for the purpose, is moderately level and does not slope too much. In order to facilitate the driving of the vehicle to be weighted up on and down off the weighbridge 1, shingle or gravel 9 can be placed at a suitable height around the outer sides of the bed 4, which is specially illustrated on FIG. 2.

To support the weighbridge 1 in the bed 4, three load cells 10, for the sensing of both upward and downward forces relative to the weighbridge, are each at their opposite ends secured between the bridge and the bed bridging a gap 11 between the two. As illustrated by the dash-dotted lines 12 in FIG. 1, the load cells 10 are so arranged that straight lines drawn from each cell to the remaining two define a triangular surface. Through this arrangement the weighbridge is always loaded in a statically determined manner whether the bed is subjected to torsion or not, and is at the same time, with the help of the load cells, able to record not only weight but also overturning moments which arise when the weight resultant of a vehicle, which for weighting is wholly or partly driven up on to the weighbridge, lies outside the triangular surface defined by the above-said straight lines.

The load cells 10 in the shown embodiment of the invention are transverse force sensing and are of the load beam type. They are preferably constructed in a conventional manner with wire strain gauges serving as transducers, and said gauges are intended as usual to be coupled to suitable electronic read-out devices for registering weighings.

In the shown embodiment of the invention, the load cells 10 are cylindrical and secured with their geometrical axes parallel to the plane of the weighbridge 1. At one end the cells are inserted into sockets 13 in the weighbridge 1, which sockets extend through the box girders 5 forming the frame and are welded to these, while the opposite ends of the cells which protrude from the bridge extend into a space 14 between the upright legs of U-shaped brackets 15 secured to the side of the frame girders 6 of the bed 4 facing the weighbridge, in which space they are retained with the help of clamps 16 which, for example by means of bolts, are fastened to the top ends of said legs and bridge the space 14, and thus the distance between the legs. The ends of the load cells 10, extending into the spaces 14, rest against blocks 17 arranged in the bottoms of the spaces 14 by means of pressure transferring knobs 18 provided on said ends, the surfaces of said knobs contacting the cooperating blocks 17 being spherically formed for obvious reasons. The blocks 17 are held in place in the brackets 15 by insertion of their lower ends into recesses formed in the part of said brackets which is situated between the upright legs.

The invention is not limited to the embodiment described above and shown on the drawings but can be modified in many other ways within the scope of the claims.

What we claim is:

1. Vehicle scale having a weighbridge supported on a bed, characterized in that three load cells for sensing both upward and downward forces relative to the weighbridge are at their opposite ends secured between the weighbridge and the bed in such a manner that straight lines drawn from each load cell to each of the two remaining, define a triangular surface whereby the weighbridge is able, together with the load cells, to respond not only to weight but also to the overturning moments which arise when the weight resultant of a vehicle standing on the weighbridge in order to be weighed lies outside the triangular surface.

2. Vehicle scale as claimed in claim 1, characterized in that the load cells are transverse force sensing cells and are of the load beam type.

3. Vehicle scale as claimed in claim 2, characterized in that the load cells are secured with their geometrical axes parallel to the plane of the weighbridge.

4. Vehicle scale as claimed in claim 3 characterized in that the bed consists of a frame surrounding the weighbridge.

* * * * *